US012635711B2

(12) United States Patent
Donskoy et al.

(10) Patent No.: US 12,635,711 B2
(45) Date of Patent: May 26, 2026

(54) FISH ANALOG PRODUCT, METHOD OF FORMING SAME AND ASSOCIATED SYSTEM AND MOLD

(71) Applicant: OSHI TECHNOLOGIES LTD, Rehovot (IL)

(72) Inventors: Igor Donskoy, Qiryat Bialik (IL); Ron Sicsic, Nataf (IL)

(73) Assignee: OSHI TECHNOLOGIES LTD, Rehovot (IL)

( * ) Notice: Subject to any disclaimer, the term of this patent is extended or adjusted under 35 U.S.C. 154(b) by 0 days.

(21) Appl. No.: 18/061,572

(22) Filed: Dec. 5, 2022

(65) Prior Publication Data

US 2024/0180193 A1 Jun. 6, 2024

(51) Int. Cl.
*A23J 3/22* (2006.01)
*A23P 20/20* (2016.01)
*A23P 30/10* (2016.01)

(52) U.S. Cl.
CPC .............. *A23J 3/227* (2013.01); *A23P 20/20* (2016.08); *A23P 30/10* (2016.08)

(58) Field of Classification Search
None
See application file for complete search history.

(56) References Cited

U.S. PATENT DOCUMENTS 5,665,419 A 9/1997 Teraguchi et al.
2011/0033581 A1* 2/2011 Yasuno ................... A23L 17/70
426/272

2018/0103653 A1 4/2018 Groneberg-Nienstedt et al.
2020/0054052 A1 2/2020 Wang
2021/0137317 A1* 5/2021 Tawara ..................... B26D 3/00
2021/0289812 A1 9/2021 Cook et al.
2022/0125072 A1 4/2022 Ben-Shitrit et al.
(Continued)

FOREIGN PATENT DOCUMENTS

CN 1911049 A 2/2007
CN 211394496 U 9/2020
CN 113303396 A * 8/2021 ................ A23J 3/16
(Continued)

OTHER PUBLICATIONS

The Culinary Institute of America, How to Portion Salmon Fillets, Youtube.com, Aug. 9, 2021 <https://www.youtube.com/watch?v=u3VmyY6ZpWo> (Year: 2021).*
(Continued)

*Primary Examiner* — Erik Kashnikow
*Assistant Examiner* — Thanh H Nguyen
(74) *Attorney, Agent, or Firm* — Allan A. Fanucci, Esq.

(57) ABSTRACT

A method and system for forming a fish analog product from layers of plant-based material stacked on one another, using a profiling bottom having an undulating upper surface that corresponds to that of a naturally occurring myomere of the fish analog product of which is to be formed. The method includes successively stacking layers of plant-based material on one another in a stacking direction on the undulating upper surface to form a stack of undulating layers, and slicing the stack through upper and lower planes oriented perpendicular to the stacking direction to remove respective upper and lower segments of the stack from a retained central segment.

12 Claims, 11 Drawing Sheets

(56)                 References Cited

U.S. PATENT DOCUMENTS

2022/0330573 A1 * 10/2022 Zotter ........................ A23J 3/14

FOREIGN PATENT DOCUMENTS

| CN | 215958251 U | 3/2022 | | |
|----|-------------|--------|---|---|
| CN | 114259040 A | 4/2022 | | |
| EP | 0362417 A1 | 4/1990 | | |
| EP | 2460411 A1 | 6/2012 | | |
| JP | 2006000154 A | 1/2006 | | |
| JP | 2010154809 A | 7/2010 | | |
| WO | 9624261 A1 | 8/1996 | | |
| WO | WO-2012127694 A1 * | 9/2012 | ............... | A23J 3/16 |
| WO | 2021007359 A1 | 1/2021 | | |
| WO | WO-2021009075 A1 * | 1/2021 | ............... | A23J 3/16 |
| WO | 2021248047 A1 | 12/2021 | | |
| WO | 2022024119 A1 | 2/2022 | | |
| WO | 2022038244 A1 | 2/2022 | | |
| WO | 2022189505 A1 | 9/2022 | | |
| WO | 2022241576 A1 | 11/2022 | | |
| WO | 2023275304 A1 | 1/2023 | | |

OTHER PUBLICATIONS

"Israeli Start-Up Rolls out 3D-Printed Vegan Steaks", NBC New York, Jun. 2020, 4 pages.
"What in the World is 3D Food Printing?", 2022, 5 pages.
"Building A Better Food System", 2022, 8 pages.

* cited by examiner

FISH ANALOG PRODUCT, METHOD OF FORMING SAME AND ASSOCIATED SYSTEM AND MOLD

TECHNOLOGICAL FIELD

The subject matter of the present specification is in the field of food technology. In particular, the present specification is directed toward a method for forming a fish analog product, the fish analog product itself, and an associated system and mold for use in forming the fish analog product.

BACKGROUND

With growing consumer awareness of issues such as climate change; sustainability and animal rights matters arising from practices such as fish farming and aquaculture; and unwanted toxins associated with harvested fish, there is a growing desire for edible seafood analog products, also known as imitation seafood.

However, many available analog products do not sufficiently resemble the seafood sought to be imitated. For example, certain fish analog products are made from an extruded paste that fails to adequately mimic the texture, taste, and/or appearance of the target fish. Such analogs may also require different methods of preparation prior to consumption. Such differences between the analogs and their target seafood products make the analogs less appealing to consumers, who may thus still prefer to purchase, prepare and/or consume real fish.

The present patent specification is primarily directed to a salmon analog product, such as a cut of salmon steak or fillet, and an associated method, system and mold for use in making the analog product. However, it will be appreciated that the teachings herein are similarly applicable to form other seafood analogs.

GENERAL DESCRIPTION

The subject matter of the present patent specification is directed to a method and system for forming a fish analog product from plant-based material. The subject matter is also directed to the fish analog product formed, and a mold for use in forming the fish analog product. It is envisaged that the resulting fish analog product can be prepared, presented and consumed similarly to that of the actual fish of which the product is an analog. Moreover, the analog product preferably is of similar nutritional value, while being free of things like bones and toxins, and other negatives associated with consuming the actual fish.

According to a first aspect of the present invention, there is provided method of forming a fish analog product from layers of plant-based material stacked on one another, the method comprising steps:

(i) providing a profiling bottom having an undulating upper surface that corresponds to that of a naturally occurring myomere of the fish analog product of which is to be formed;

(ii) successively stacking layers of plant-based material on one another in a stacking direction on the undulating upper surface to form a stack of undulating layers; and (iii) slicing the stack through upper and lower planes oriented perpendicular to the stacking direction to remove respective upper and lower segments of the stack from a retained central segment comprising a plurality of said layers, a distance between said planes corresponding to a thickness of the analog to be formed. By utilizing the present method, it is possible to form a stack of plant-based material which can then be cut and/or further shaped so as to mimic the appearance of an actual cut of fish, such as a cut of salmon steak or salmon fillet.

It is envisaged that in successively stacking alternating layers on one another, a first of the alternating layers may correspond with artificial muscle tissue of the analog to be formed, and a second of the alternating layers may correspond with artificial connective tissue of the analog to be formed. In this way, the stack of alternating layers mimics the visual appearance and flaking behavior of fish, such as salmon, when it is cut.

In certain embodiments of the present method, prior to slicing the stack through the upper and lower planes, the disclosed method may include compacting the stacked layers in the stacking direction such that the stacked layers conform to the undulating upper surface of the profiling bottom. For example, compaction of the stacked layers may comprise sandwiching the layers between the profiling bottom and a profiling top having an undulating lower surface complementary to the undulating upper surface of the profiling bottom. The sandwiching of the stacked layers may simply comprise moving at least one of the profiling top and the profiling bottom toward the other to compact the stacked layers therebetween. In this way, the stacked layers can be firmly pressed between the profiling top and bottom and thus adopt the shape of the undulating topographies thereof; this compaction of the layers against one another may also minimize the likelihood of the layers detaching from one another.

The present method may further comprise (iv) cutting the central segment along the stacking direction to form a cross-sectional shape of the analog product. For example, this cutting step may include arranging at least one cutting template adjacent to the central segment, the cutting template having a cutting shape formed therethrough which corresponds with the cross-section of the analog to be formed. In one embodiment, a cutting element can be guided along a perimeter of the cutting shape so as to cut through the retained central segment in the stacking direction. In an alternative embodiment, the at least one cutting template can be pressed along the stacking direction through the retained central segment so that the stacked layers thereof extrude through the cutting shape to form the fish analog product.

In certain embodiments of the presently disclosed method, it is envisaged that each layer may be performed into similarly shaped strips which are sized for stacking on the undulating upper surface of the profiling bottom.

According to a second aspect of the present invention, there is provided a system for use in a method of forming a fish analog product from stacked layers of plant-based material, the system comprising a molding assembly having:

a profiling bottom having an undulating upper surface corresponding to that of a naturally occurring myomere of the fish the analog product of which is to be formed and upon which successive layers of the plant-based material can be stacked such that at least the first stacked layer conforms to the undulating upper surface.

In utilizing an undulating upper surface which corresponds to naturally occurring myomere of a target fish, it becomes possible to form thereon a stack of plant-based layers which can be subsequently processed so as to resemble the flesh of the target fish. As such, the geometry and construction of the profiling bottom is significant. In one embodiment, a lengthwise cross-section of the profiling bottom is nonuniform. Additionally, it is envisaged that for any lengthwise cross-section of the profiling bottom, the undulating upper edge of that cross-section is in the form of at least one cycle of a sinusoidal-like wave. It is also envisaged that a widthwise cross-section of the profiling bottom is nonuniform and that for any widthwise cross-section of the profiling bottom, the upper edge of that cross-section is in the form of an arc progressing from a lowermost first end through an uppermost point to a second end.

According to embodiments of the present system the molding assembly may also comprise a first barrier for enclosing the undulating upper surface of the profiling bottom so as to maintain alignment of the stacked layers on the undulating upper surface of the profiling bottom. For example, the first barrier may comprise sidewalls that form part of the molding assembly which, in use, can border the stacked layers and keep them on the undulating upper surface.

The present system may further comprise a thickness-defining portion for defining the thickness of the analog product to be formed, wherein the thickness-defining portion comprises a frame configured to bound a central segment of the stacked layers, a height of which central segment corresponds with the thickness of the analog product to be formed. For example, the frame may comprise an upper surface and/or a lower surface across which a cutting element can be passed to remove a respective upper segment and/or a lower segment of the stacked layers unbounded by the frame. In so doing, a central segment of the stacked layers may be retained within the thickness-defining portion, which central segment can then be further shaped to form a fish analog product. Preferably, a height of the frame of the thickness-defining portion is less than a peak-to-peak distance of the undulating upper surface of the profiling bottom.

In embodiments of the present system, the molding assembly may further comprise a profiling top having an undulating lower surface which is complementary to the undulating upper surface of the profiling bottom, wherein in use, the stacked layers are compacted between the respective undulating surfaces of the profiling top and the profiling bottom. For example, in use, at least one of the profiling top and the profiling bottom is moved toward the other to sandwich the stacked layers therebetween. In one embodiment, the profiling top is driven downwardly toward the profiling bottom to compress the stacked layers therebetween.

Similar to the aforementioned first barrier, the molding assembly of the presently disclosed system may also comprise a second barrier for enclosing the upper segment and locating the profiling top thereon. Like the first barrier, the second barrier may also comprise sidewalls that form part of the molding assembly. In this way, the second barrier helps maintain alignment of the stacked layers, and particularly the upper segment thereof which protrudes out a top of the thickness-defining portion. Preferably, the thickness-defining portion would be arranged between the respective sidewalls of the first and second barriers.

The presently disclosed system may further comprise:
an upper cutting template; and/or
a lower cutting template,
the or each template having a cutting shape formed therethrough which corresponds with a cross-section of the analog product to be formed. The cutting templates can thus be utilized to obtain a final form of the fish product analog from the retained central segment of stacked layers within the thickness-defining portion. Preferably, a footprint of the cutting shape falls over at least one peak and at least one trough of the undulating upper surface of the profiling bottom.

In use, the thickness-defining portion can be sandwiched between the upper cutting template and the lower cutting template such that a cutting element can cut through the stacked layers and along a perimeter of the cutting shapes of the respective cutting templates to form the analog product. Preferably, a peak-to-peak distance of the undulating upper surface of the profiling bottom is greater than a thickness of the analog product to be formed.

In embodiments of the presently disclosed system the myomere in respect of which the undulating upper surface of the profiling bottom corresponds is that of a fish species the analog product of which is to be formed. For example, the undulating upper surface of the profiling bottom may correspond with that of the myomere of salmon. As such, the presently disclosed system may be utilized to form an edible plant-based salmon analog, such as salmon fillet or salmon steak.

It is envisaged that the above-described system may be used in a method according to a first aspect of the present invention.

According to a third aspect of the present invention, there is provided a fish analog product made from undulating layers of plant-based material stacked on one another in a stacking direction such that the stack of layers comprises at least one convex zone and at least one concave zone, wherein each lengthwise cross-section of the product passes through at least one convex zone in which said layers are curved in a convex manner and at least one concave zone in which said layers are curved in a concave manner. Preferably, the layers of the fish analog product are compacted together in the stacking direction such that each layer adheres to at least one other adjacent layer. It is envisaged that such a fish analog product may resemble the target fish of which it is an analog and may even mimic the flaking behavior of the flesh of the target fish during cooking and/or consumption.

Preferably, the undulating layers may comprise alternating layers successively stacked on one another, a first of the alternating layers corresponding with artificial muscle tissue of the fish analog product, a second of the alternating layers corresponding with artificial connective tissue of the fish analog product. This manner of constructing the stack more closely approximates the layered flesh of the target fish product and can promote the flaking behavior of the flesh during cooking or consumption.

In certain embodiments, the presently disclosed fish analog product may be formed from a central segment of the stacked layers that remains after removal of an upper segment and a lower segment of the stacked layers via slicing therethrough along respective predetermined upper and lower planes oriented perpendicular to the stacking direction. In this way, the analog product has a thickness that corresponds with a height of the central segment of stacked layers.

Preferably, the upper and lower planes are positioned such that, upon slicing, an exposed surface of the central segment comprises at least one set of generally curved contour lines radiating radially outwardly. These curved contour lines preferably mimic those existing in the actual flesh of the target fish.

According to certain embodiments of the present analog product, the undulation of each layer corresponds with that of a naturally occurring myomere of the fish the analog product of which resembles. For example, the naturally occurring myomere may be that of a salmon, in which case the analog product may be that of a cut of salmon, such as a cut of salmon fillet or a cut of salmon steak.

According to a fourth aspect of the present invention, there is provided a fish analog product formed from:

a method according to a first aspect of the present invention; and/or a system according to a second aspect of the present invention.

According to a fifth aspect of the present invention, there is provided a mold for use in a method of forming a fish analog product from stacked layers of plant-based material, the mold having an undulating upper surface wherein:

for any lengthwise cross-section of the mold, the upper edge of that cross-section follows an undulating path; and for any widthwise cross-section of the mold, the upper edge of that cross-section is in the form of an arc progressing from a lowermost first end through an uppermost point to a second end.

The mold helps to define the structure of the resulting fish analog product, and thus the geometry of the mold is significant. To this end, it is preferable that the undulating upper edge of any lengthwise cross-section of the mold comprises at least one cycle of a sinusoidal-like wave such that the undulation includes at least one peak and at least one trough. Even more preferably, it is envisaged that the lengthwise cross-section of the mold is nonuniform; and/or the widthwise cross-section of the mold is nonuniform.

In certain embodiments of the presently disclosed mold, the undulating upper surface thereof corresponds to that of a naturally occurring myomere of the fish of which the formed product is an analog. For example, the undulating upper surface may correspond with the naturally occurring myomere of that of salmon, thereby enabling the construction of a salmon analog product.

According to a sixth aspect of the present invention, there is provided a mold for use in:

a method according to a first aspect of the present invention, the mold being the profiling bottom provided at step (i); and/or a system according to a second aspect of the present invention, the mold being the profiling bottom of the mold assembly; and/or forming a fish analog product according to a fourth or fifth aspects of the present invention.

The term "fillet" as used herein can denote to a fillet of any kind, i.e., steak, top loin, bottom loin, etc.

Embodiments

The following are possible embodiments of the presently disclosed subject matter.

1. A method of forming a fish analog product from layers of plant-based material stacked on one another, the method comprising steps:

(i) providing a profiling bottom having an undulating upper surface that corresponds to that of a naturally occurring myomere of the fish analog product of which is to be formed;

(ii) successively stacking layers of plant-based material on one another in a stacking direction on the undulating upper surface to form a stack of undulating layers; and (iii) slicing the stack through upper and lower planes oriented perpendicular to the stacking direction to remove respective upper and lower segments of the stack from a retained central segment comprising a plurality of said layers, a distance between said planes corresponding to a thickness of the analog to be formed.

2. The method of Embodiment 1, wherein step (ii) includes successively stacking alternating layers on one another, a first of the alternating layers corresponding with artificial muscle tissue of the analog to be formed, a second of the alternating layers corresponding with artificial connective tissue of the analog to be formed.

3. The method of Embodiment 1 or 2, further comprising, prior to step (iii), compacting the stacked layers in the stacking direction such that the stacked layers conform to the undulating upper surface of the profiling bottom.

4. The method of Embodiment 3, wherein compaction of the stacked layers comprises sandwiching thereof between the profiling bottom and a profiling top having an undulating lower surface complementary to the undulating upper surface of the profiling bottom.

5. The method of claim 4, wherein sandwiching of the stacked layers comprises moving at least one of the profiling top and the profiling bottom toward the other to compact the stacked layers therebetween.

6. The method of any one of the preceding Embodiments, further comprising:

(iv) cutting the central segment along the stacking direction to form a cross-sectional shape of the analog product.

7. The method of Embodiment 6, wherein step (iv) includes arranging at least one cutting template adjacent to the central segment, the cutting template having a cutting shape formed therethrough which corresponds with the cross-section of the analog to be formed.

8. The method of Embodiment 7, wherein step (iv) includes guiding a cutting element along a perimeter of the cutting shape so as to cut through the retained central segment in the stacking direction.

9. The method of Embodiment 7, wherein step (iv) includes pressing the at least one cutting template along the stacking direction through the retained central segment so that the stacked layers thereof extrude through the cutting shape to form the fish analog product.

10. The method of any one of the preceding Embodiments, wherein prior to step (i), each layer is formed into similarly shaped strips sized for stacking on the undulating upper surface of the profiling bottom.

11. A system for use in a method of forming a fish analog product from stacked layers of plant-based material, the system comprising a molding assembly having:

a profiling bottom having an undulating upper surface corresponding to that of a naturally occurring myomere of the fish the analog product of which is to be formed and upon which successive layers of the plant-based material can be stacked such that at least the first stacked layer conforms to the undulating upper surface.

12. The system of Embodiment 11, wherein:

a lengthwise cross-section of the profiling bottom is nonuniform; and for any lengthwise cross-section of the profiling bottom, the undulating upper edge of that cross-section is in the form of at least one cycle of a sinusoidal-like wave.

13. The system of Embodiment 11 or 12, wherein:

a widthwise cross-section of the profiling bottom is nonuniform; and for any widthwise cross-section of the profiling bottom, the upper edge of that cross-section is in the form of an arc progressing from a lowermost first end through an uppermost point to a second end.

14. The system of any one of Embodiments 11 to 13, wherein the molding assembly further comprises a first barrier for enclosing the undulating upper surface of the profiling bottom so as to maintain alignment of the stacked layers on the undulating upper surface of the profiling bottom.

15. The system of Embodiment 14, wherein the first barrier comprises sidewalls that form part of the molding assembly.

16. The system of Embodiment 15, further comprising a thickness-defining portion for defining the thickness of the analog product to be formed, wherein the thickness-defining portion comprises a frame configured to bound a central segment of the stacked layers, a height of which central segment corresponds with the thickness of the analog product to be formed.

17. The system of Embodiment 16, wherein the frame comprises an upper surface and/or a lower surface across which a cutting element can be passed to remove a respective upper segment and/or a lower segment of the stacked layers unbounded by the frame.

18. The system of Embodiment 16 or 17, wherein a height of the frame of the thickness-defining portion is less than a peak-to-peak distance of the undulating upper surface of the profiling bottom.

19. The system of any one of Embodiments 11 to 18, wherein the molding assembly further comprises a profiling top having an undulating lower surface which is complementary to the undulating upper surface of the profiling bottom, wherein in use, the stacked layers are compacted between the respective undulating surfaces of the profiling top and the profiling bottom.

20 The system of Embodiment 19, wherein at least one of the profiling top and the profiling bottom is moved toward the other to sandwich the stacked layers therebetween.

21. The system of Embodiment 19 or 20, wherein the molding assembly further comprises a second barrier for enclosing the upper segment and locating the profiling top thereon.

22. The system of Embodiment 21, wherein the second barrier comprises sidewalls that form part of the molding assembly.

23. The system of Embodiment 21 or 22 as appended to any one of Embodiments 16 to 18, wherein the thickness-defining portion is arrangeable between the respective sidewalls of the first and second barriers.

24 The system of any one of Embodiments 11 to 23, further comprising:
an upper cutting template; and/or
a lower cutting template,
the or each template having a cutting shape formed therethrough which corresponds with a cross-section of the analog product to be formed.

25. The system of Embodiment 24, wherein a footprint of the cutting shape falls over at least one peak and at least one trough of the undulating upper surface of the profiling bottom.

26. The system of Embodiment 24 or 25, wherein in use, the thickness-defining portion is sandwiched between the upper cutting template and the lower cutting template such that a cutting element can cut through the stacked layers and along a perimeter of the cutting shapes of the respective cutting templates to form the analog product.

27. The system of any one of Embodiments 11 to 26, wherein a peak-to-peak distance of the undulating upper surface of the profiling bottom is greater than a thickness of the analog product to be formed.

28. The system of any one of Embodiments 11 to 27, wherein the myomere in respect of which the undulating upper surface of the profiling bottom corresponds is that of a fish species the analog product of which is to be formed.

29. The system of any one of Embodiments 11 to 28, wherein the undulating upper surface of the profiling bottom corresponds with that of the myomere of salmon.

30. The system of any one of Embodiments 11 to 29 for use in the method of any one of Embodiments 1 to 10.

31. A fish analog product made from undulating layers of plant-based material stacked on one another in a stacking direction such that the stack of layers comprises at least one convex zone and at least one concave zone, wherein each lengthwise cross-section of the product passes through at least one convex zone in which said layers are curved in a convex manner and at least one concave zone in which said layers are curved in a concave manner.

32. The analog product of Embodiment 31, wherein the layers are compacted together in the stacking direction such that each layer adheres to at least one other adjacent layer.

33. The analog product of Embodiment 31 or 32, wherein the undulating layers comprise alternating layers successively stacked on one another, a first of the alternating layers corresponding with artificial muscle tissue of the fish analog product, a second of the alternating layers corresponding with artificial connective tissue of the fish analog product.

34. The analog product of any one of Embodiments 31 to 33, formed from a central segment of the stacked layers that remains after removal of an upper segment and a lower segment of the stacked layers via slicing therethrough along respective predetermined upper and lower planes oriented perpendicular to the stacking direction.

35. The analog product of Embodiment 34, having a thickness that corresponds with a height of the central segment of stacked layers.

36. The analog product of Embodiment 34 or 35, wherein the upper and lower planes are positioned such that, upon slicing, an exposed surface of the central segment comprises at least one set of generally curved contour lines radiating radially outwardly.

37. The analog product of any one of Embodiments 31 to 36, wherein the undulation of each layer corresponds with that of a naturally occurring myomere of the fish the analog product of which resembles.

38. The analog product of Embodiment 37, wherein the naturally occurring myomere is that of a salmon.

39. A fish analog product formed from:
a method of any one of Embodiments 1 to 10; and/or
a system of any one of Embodiments 11 to 30.

40. A mold for use in a method of forming a fish analog product from stacked layers of plant-based material, the mold having an undulating upper surface wherein:

for any lengthwise cross-section of the mold, the upper edge of that cross-section follows an undulating path; and for any widthwise cross-section of the mold, the upper edge of that cross-section is in the form of an arc progressing from a lowermost first end through an uppermost point to a second end.

41. The mold of Embodiment 40, wherein the undulating upper edge of any lengthwise cross-section of the mold comprises at least one cycle of a sinusoidal-like wave such that the undulation includes at least one peak and at least one trough.

42. The mold of Embodiment 40 or 41, wherein:

the lengthwise cross-section of the mold is nonuniform; and/or the widthwise cross-section of the mold is nonuniform.

43. The mold of any one of Embodiments 40 to 42, wherein the undulating upper surface thereof corresponds to that of a naturally occurring myomere of the fish of which the formed product is an analog.

44. A mold for use in:

a method according to any one of Embodiments 1 to 10, the mold being the profiling bottom provided at step (i); and/or a system according to any one of Embodiments 11 to 30, the mold being the profiling bottom of the mold assembly; and/or forming a fish analog product according to any one of Embodiments 31 to 39.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
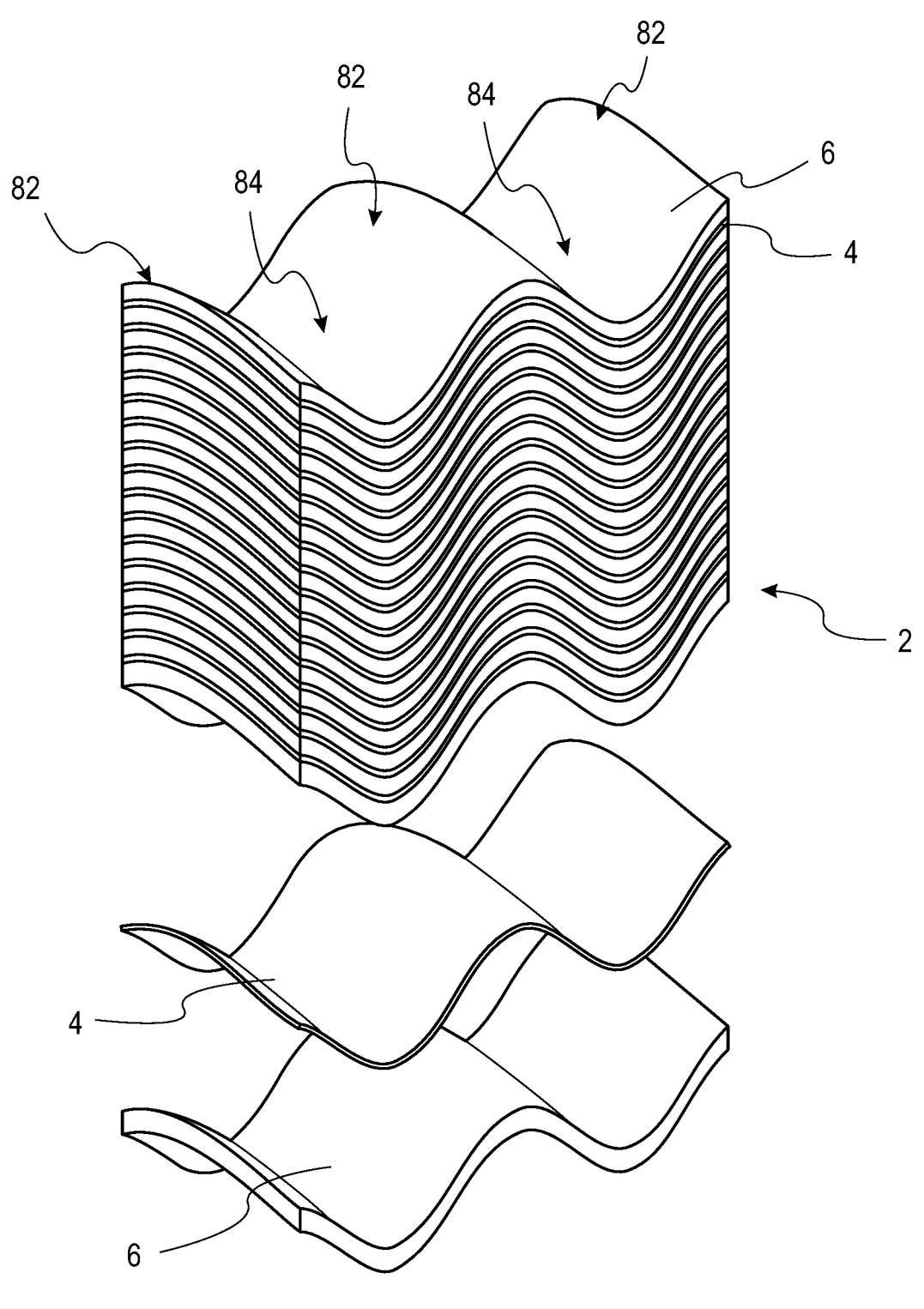
FIG. 1 is a partially exploded perspective view of undulating layers of plant-based material stacked on one another used to form a fish analog product according to examples of the presently disclosed subject matter.
Figure 2A:
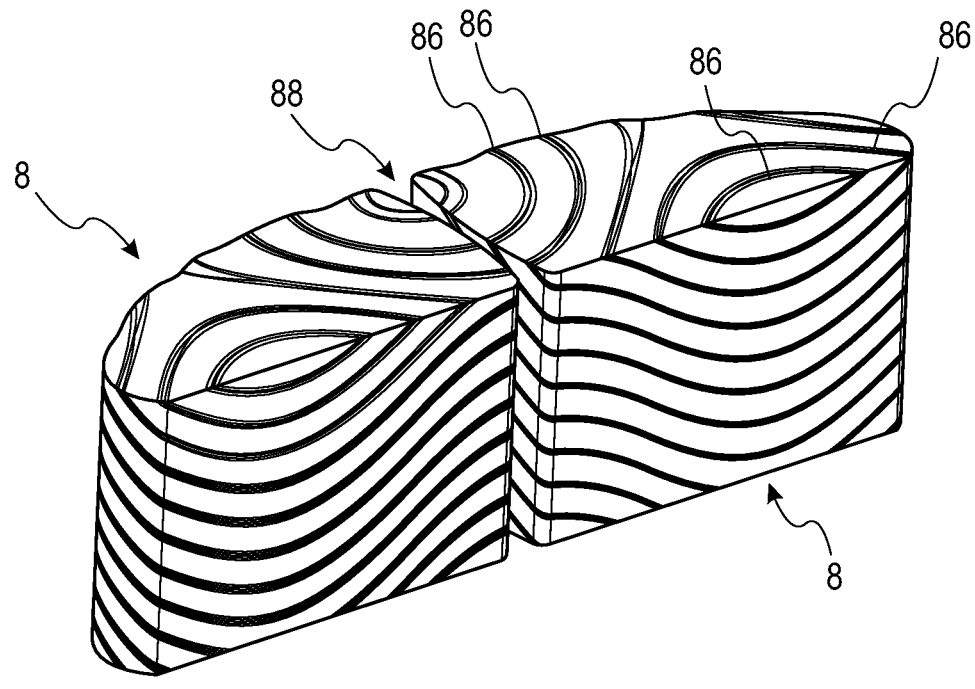
FIG. 2A is a perspective view of two cuts of fish fillet analog formed from the stacked layers of FIG. 1.
Figure 2B:
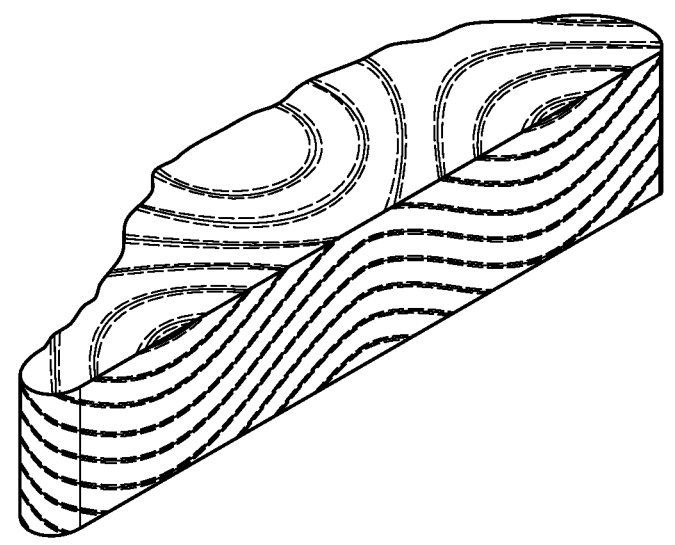
FIG. 2B is a perspective view of a cut of fish fillet analog formed from the stacked layers of FIG. 1.

FIG. 1 shows a stack 2 of sheets or layers of plant-based material 4, 6 stacked on one another in a generally vertical stacking direction. In examples of the present subject matter, the layers 4, 6 may be initially formed as relatively flat sheets (not shown), and, as will be discussed, through the presently disclosed method, system and mold, the layers 4, 6 can be shaped to assume the closely packed stack 2 of FIG. 1. In other embodiments of the presently disclosed subject matter the layers 4, 6 can be initially formed as deformed sheets stackable above one another in a tight manner, optionally undulated, and further optionally undulated as described with respect to the layers 4 and 6. Each layer 4, 6 has a predetermined and substantially identical undulating form and topography. It is from this stack 2 of undulating layers 4, 6 of plant-based material that a fish analog product 8 can be formed, an example of which is shown in FIG. 2. For ease of discussion, the target fish of which the present fish product is an analog shall be referred to as salmon, though it will be appreciated that the present teachings may be similarly applied to form plant-based analogs of various other types and species of fish.

Firstly, it will be appreciated that the plant-based layers 4, 6 are edible and may be formed from things such as legume proteins and algae extracts. The layers 4, 6 may be 3D printed, though other production methods are within the scope of the present specification. Preferably, the composition of the plant-based material mimics the nutritional value of the target fish (e.g., salmon). However, examples of the present salmon analog product are free of things like bones and toxins. As such, it is envisaged that consumption of fish analog products according to examples of the present subject matter provides similar nutritional value to eating the target fish, while avoiding certain undesirable attributes associated with eating the actual target fish. It is also envisaged that the end product, being a salmon analog product, may be prepared and cooked in a manner that is generally similar if not identical to that applicable to conventional salmon. As such, consumers may readily switch from conventional salmon to the present salmon analog product without modifying preparation or cooking routines and with minimal impact on taste, texture and nutritional value.

As shown in FIG. 1, the stack of undulating layers 2 of plant-based material may be formed from two different types of sheets or layers 4, 6, alternatingly stacked on top of one another. For example, the alternating layers may comprise a first layer 6 having properties (e.g., texture, thickness, density) corresponding to that of muscle tissue of salmon, and a second layer 4 having properties (e.g., texture, thickness and density) corresponding to that of connective tissue (i.e., myoseptum) of salmon. In this way, the two types of layers 4, 6 are representative of artificial connective and muscle tissue of salmon and are arranged in an alternating manner just like in conventional salmon so as to replicate the flaking phenomenon that occurs when conventional salmon is cut during consumption.

Having formed the alternating layers 4, 6, a first step in the presently disclosed method for forming a fish analog product involves shaping the layers 4, 6 so that they have an undulating form, an example of which form is shown in FIG. 1. As will be discussed, this undulating form is based on that of a naturally occurring myomere 10 (FIG. 11) of salmon, enabling further predetermined cuts of the undulating layers 4, 6 to be made to obtain desired salmon analog products that resemble whole-cuts of conventional salmon, such as salmon fillet and salmon steak.

Figure 3:
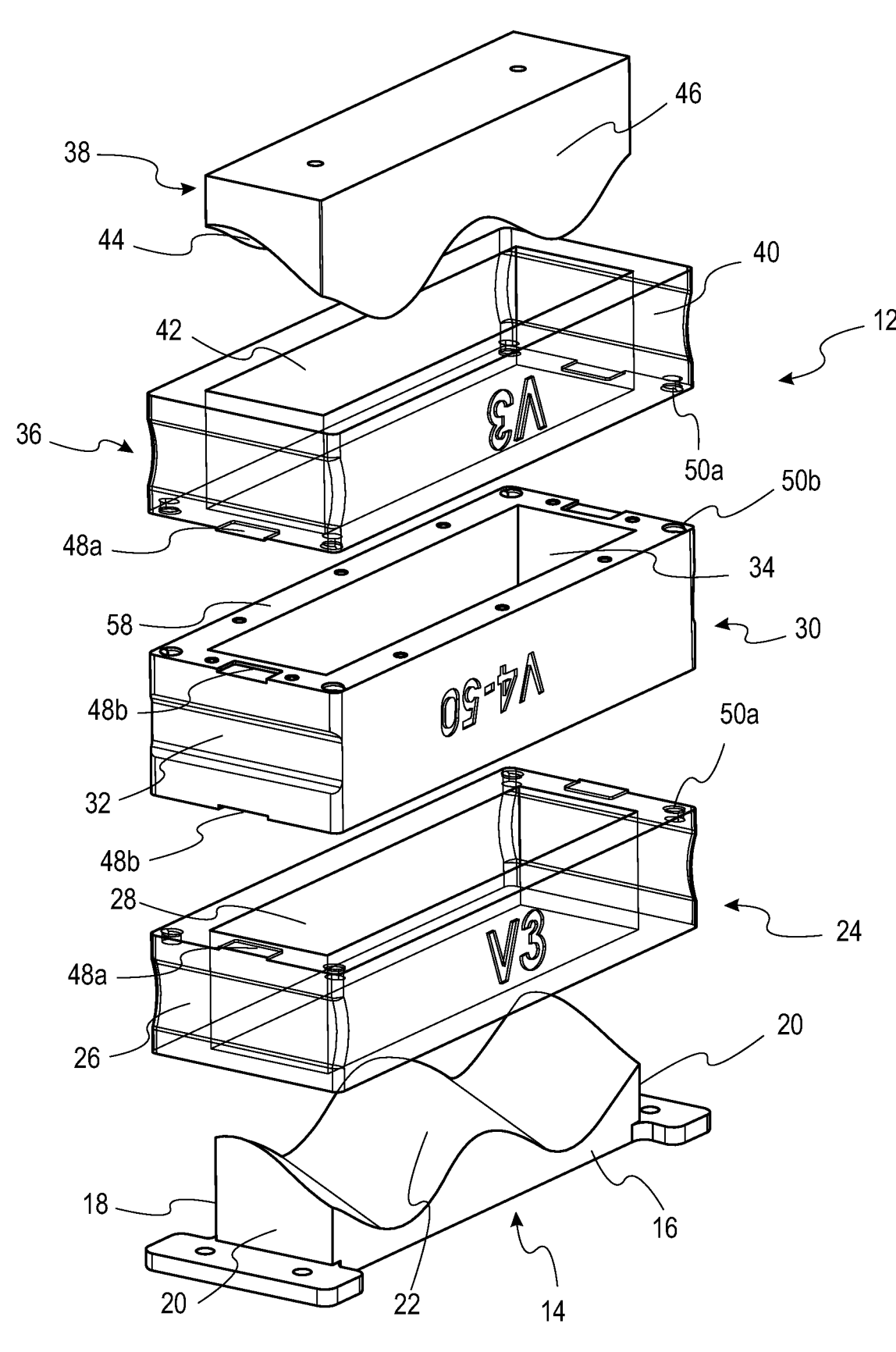
FIG. 3 is an exploded perspective view of a molding assembly for use in a method of forming the fish analog products of FIGS. 2A and 2B.

Various methods for shaping and/or stacking the layers 4, 6 so as to attain the undulating form are within the scope of the present specification. With reference to FIG. 3, there is shown an example molding assembly 12 that can be used to form the undulating stacked 2 of FIG. 1. The molding assembly 12 may be part of an example system for use in a method for forming salmon analog products according to examples of the present subject matter.

Figure 4:
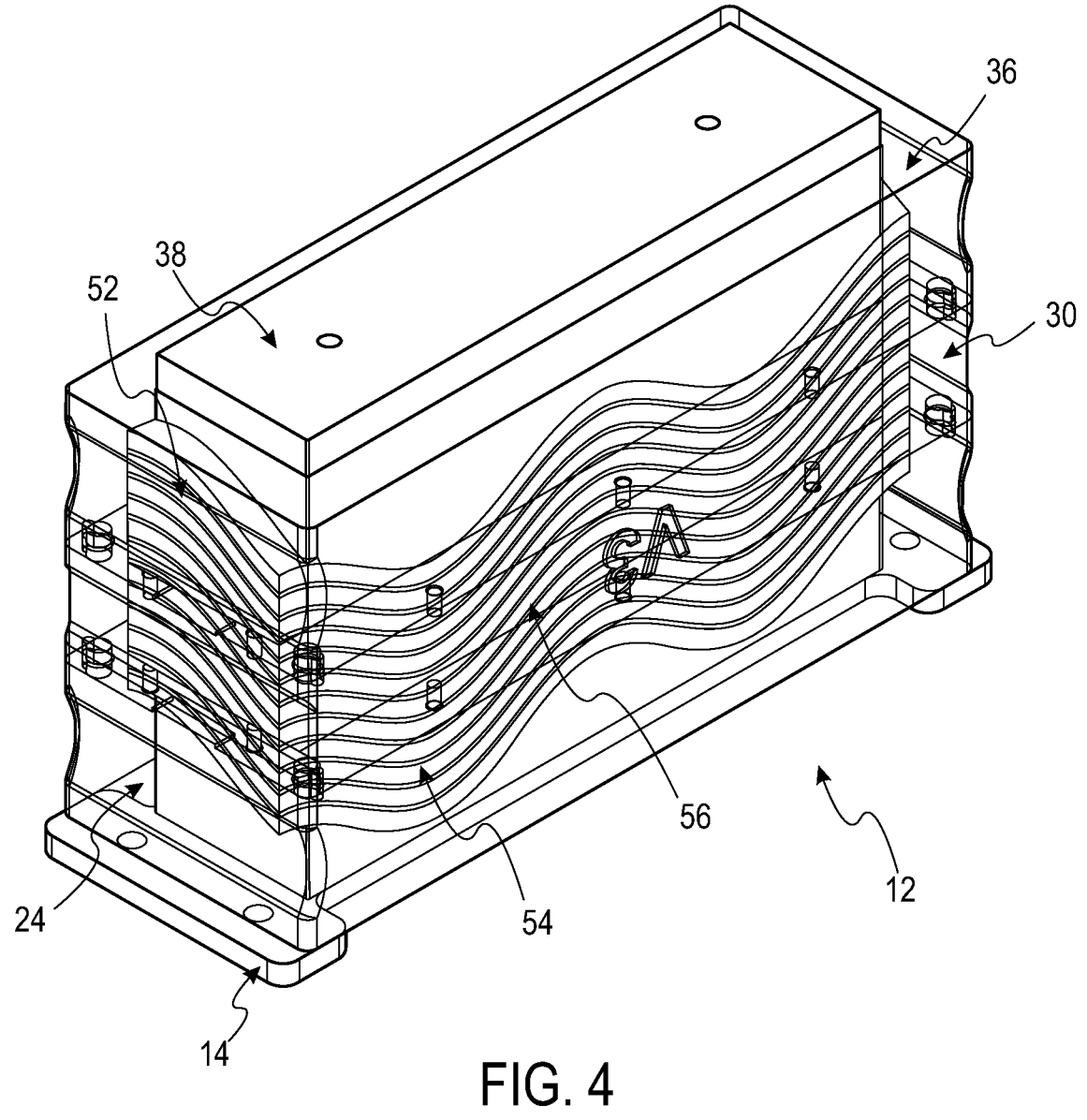
FIG. 4 is an assembled perspective view of the molding assembly of FIG. 3 shown compacting layers of plant-based material together, where a thickness-defining portion of the molding assembly is shown transparent for clarity purposes.

FIG. 3 shows the molding assembly 12 in an exploded state, and FIG. 4 shows the assembly 12 being used to mold the stacked layers of plant-based material so that they attain the desired undulating form. The molding assembly 12 comprises a profiling bottom 14 having a generally rectangular footprint defined by opposed front and rear walls 16, 18 and opposed sidewalls 20. In other embodiments of the presently disclosed subject matter, the footprint of the profiling bottom can have a different shape than rectangular, e.g., a shape of the cut to be achieved. As will be discussed, the profiling bottom 14 has an undulating upper surface 22 which corresponds to that of a salmon myomere 10 (shown in FIG. 11). The sheet-like layers 4, 6 of plant-based material may be deposited, e.g., successively, onto the undulating surface 22 of the profiling bottom 14. The profiling bottom 14 is also referred to as a 'mold' 14 in the present specification, including the claims herein.

The molding assembly 12 also comprises a bottom barrier 24 which, in use, is configured to generally enclose or bound the undulating upper surface 22 of the profiling bottom 14. In FIGS. 3 and 4, the bottom barrier 24 is depicted as a generally rectangular frame having sidewalls 26 defining a rectangular opening 28 that fits snugly over and around the walls 16, 18, 20 of the profiling bottom 14. For ease of visualization, the bottom barrier is shown as partially transparent. A height of the sidewalls 26 of the rectangular frame 24 extends vertically above the highest point or peak of the undulating upper surface 22 of the profiling bottom 14. In this way, the rectangular barrier 24 helps to frame a lower segment of the layers 4, 6 as they are stacked onto the undulating upper surface 22 of the profiling bottom 14, thereby helping to maintain alignment of the stack of layers 4, 6 thereon.

The molding assembly 12 further comprises a thickness-defining portion 30 configured to define a thickness of the salmon analog to be formed. The depicted thickness-defining portion 30 comprises a rectangular frame having four sidewalls 32 defining a rectangular opening 34 therein. The rectangular opening 34 is sized to fit around and bound a central segment of the stacked layers 2 of plant-based material as they are stacked vertically atop one another upon the profiling bottom 14. The height of the sidewalls 32 of the thickness-defining portion 30 generally corresponds with a thickness of the salmon analog product to be formed and is preferably taller than a height of the sidewalls 26 of the bottom barrier. In particular, the height of the sidewalls 32 of the thickness-defining portion 30 is less than a peak-to-peak distance of the undulating upper surface 22 of the profiling bottom 14.

The molding assembly 12 also comprises a top barrier 36 and a profiling top 38 which are analogous to and symmetrically disposed relative to the respective bottom barrier 24 and profiling bottom 14. The top barrier 36 also comprises a rectangular frame having sidewalls 40 defining a rectangular opening 42 sized to snugly fit over and bound an upper segment of the stacked layers 2 so as to help maintain alignment thereof. The profiling top 38 has a lower undulating surface 44 complementary to the upper undulating surface 22 of the profiling bottom 14. As such, the respective undulating surfaces 22, 44 of the profiling bottom and top 14, 38 can be arranged against one another such that the undulating surfaces 22, 44 are almost able to tessellate with one another. The profiling top 38 similarly has a rectangular footprint defined by four sidewalls 46 configured to be snugly received within the correspondingly shaped rectangular opening 42 of the top barrier 36.

In use, the thickness-defining portion 30 is sandwiched between the bottom and top barriers 24, 36. Referring also to FIG. 4, the sidewalls 32 of the thickness-defining portion 30 are sandwiched between and against the respective sidewalls 40, 26 of the top and bottom barriers 36, 24 such that the rectangular openings of each barrier 28, 42 and the rectangular opening 34 of the thickness-defining portion 30 are aligned with each other and form a continuous rectangular opening having a constant footprint in which the stacked layers 2 are snugly bound. The thickness-defining portion 30 may be located relative to the barriers 24, 36 via complementary locating features 48a, 48b and/or may be removably secured thereto via corresponding fastening features 50a, 50b. The profiling top 38 may then be inserted into the rectangular opening 42 of the top barrier 36 and driven downward in the vertical stacking direction, thereby pressing into the stacked layers 2 and urging them down against the undulating upper surface 22 of the profiling bottom 14. In this way, the stacked layers 2 are compacted between the profiling top 38 and the profiling bottom 14, and in particular, the respective undulating surfaces 44, 22 thereof, while being framed and aligned by the thickness-defining portion 30 and the top and bottom barriers 36, 24. As such, the deformable stacked layers 2 are compressed between the profiling top 38 and the profiling bottom 14 and thus each layer 4, 6 is caused to deform and adopt (i.e., be imprinted by) the undulating form and topography of that of the respective undulating surfaces 44, 22 of the profiling top 36 and bottom 14, thereby achieving the intermediate stage of the stacked undulating layers 2 shown in FIG. 1.

It is envisaged that one or more of the undulating layers 4, 6 may be formed and/or stacked at a time to form the stack 2 from which the fish product analog 8 is to be formed. For example, it may be that only a single connective tissue layer 4 or a single muscle tissue layer 6 is initially deposited onto the undulating upper surface 22 of the profiling bottom 14, whereupon the profiling top 38 can then be driven downwardly in the vertical stacking direction such that the layer 4 or 6 is pressed between the undulating surfaces 22, 44 of the respective profiling bottom 22 and profiling top 38 so as to be shaped by their respective undulating topographies. The profiling top 38 can then be withdrawn upwardly and the next layer 4 or 6 may be deposited onto the already pressed layer and the above-described pressing process can be repeated for each subsequent layer until a stack 2 of undulating layers 4, 6 is obtained. Of course, the process may involve sequentially molding one layer at a time, or two or more layers at a time. It is also envisaged that the molded layers 4, 6, instead of being stacked via the present molding assembly 12, can be stacked elsewhere (e.g., at a stacking station). For example, after one or more layers 4, 6 are molded, they can simply be removed from the molding assembly 12 ready to be stacked elsewhere.

Figure 5:
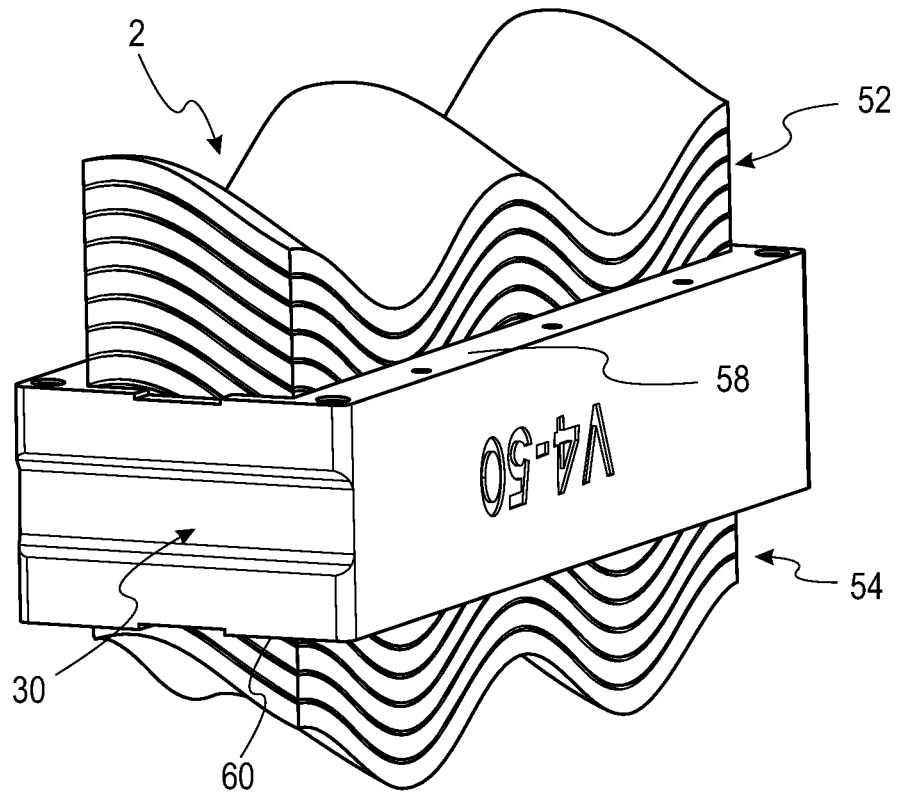
FIG. 5 is a side perspective view of the compacted layers bounded by a thickness-defining portion of the molding assembly.
Figure 6A:
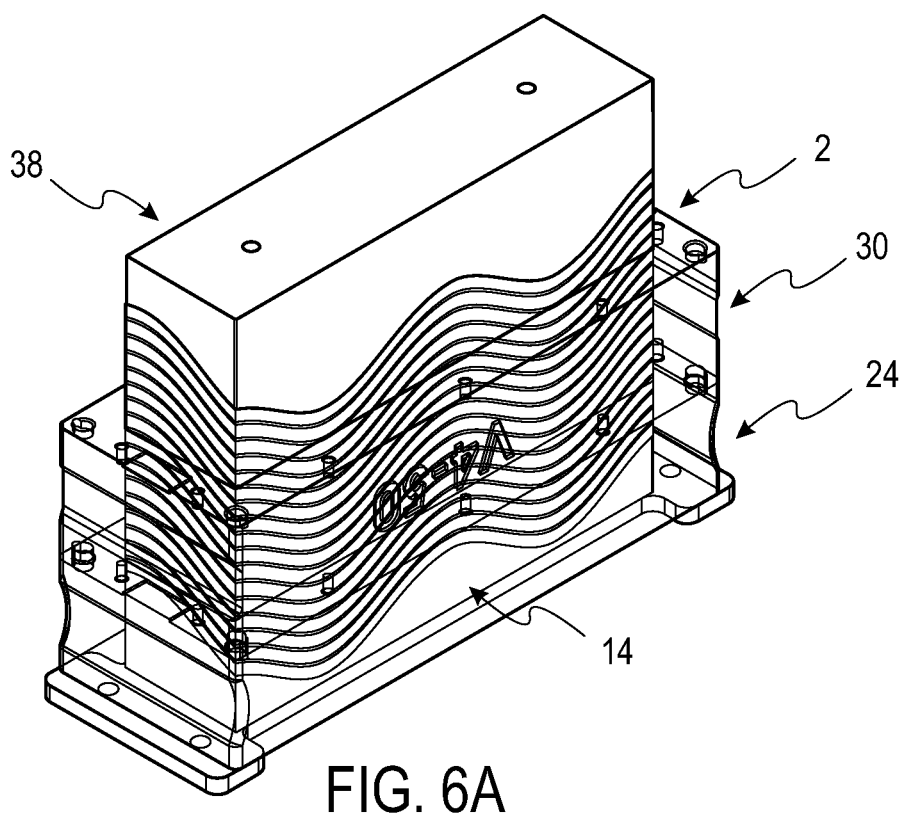
FIGS. 6A to 7B illustrate respective steps for configuring the molding assembly to facilitate slicing and cutting of the stacked layers, where the thickness-defining portion of the molding assembly is shown transparent for clarity purposes.
Figure 6B:
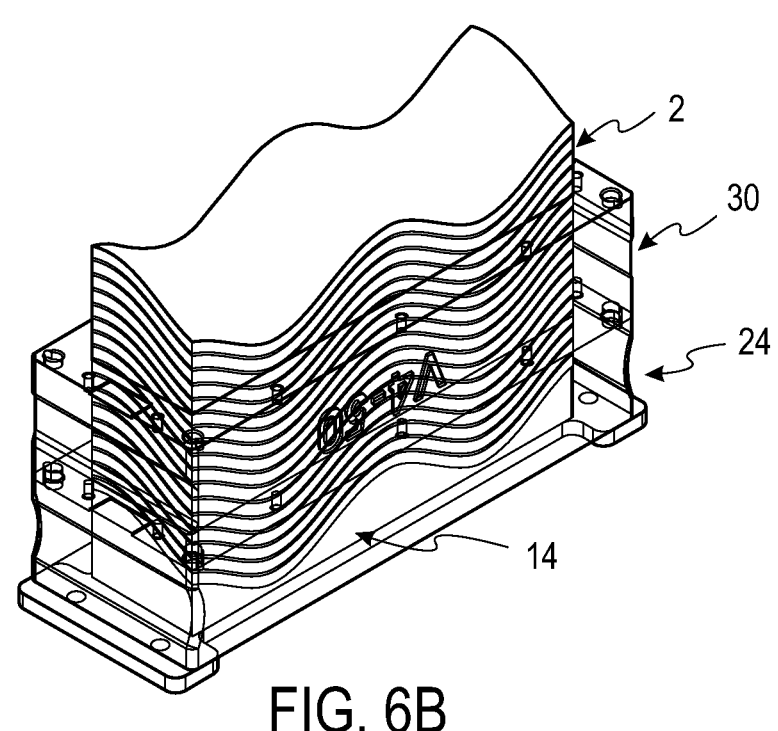
Figure 7A:
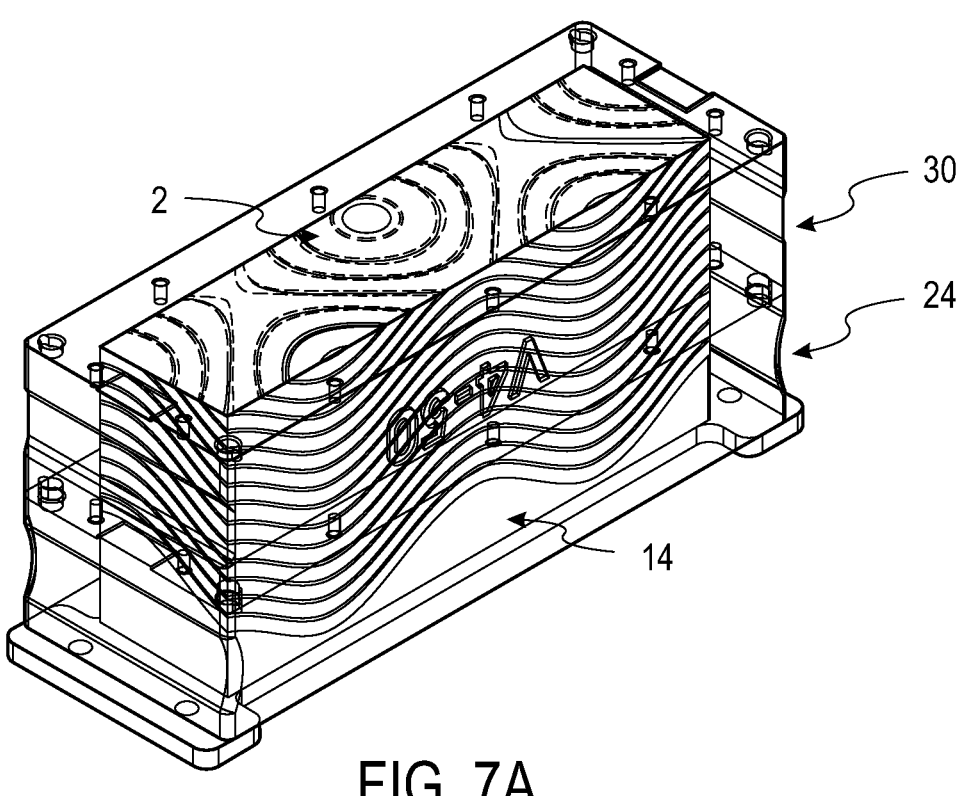
Figure 7B:
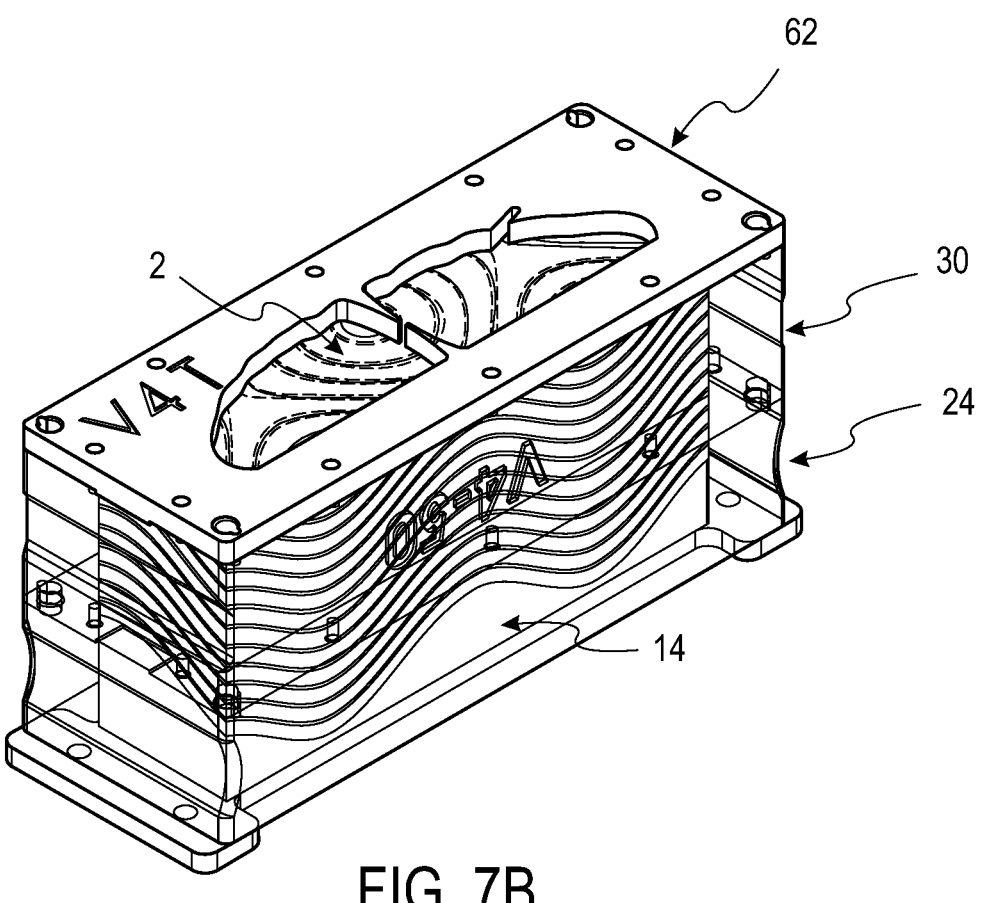

A subsequent step in the present method of forming the salmon analog product involves slicing through the stack 2 of undulating layers at predetermined locations so as to achieve an intermediate salmon analog product that has the desired thickness. Various means of implementing this slicing step are considered within the scope of the present specification. FIG. 5 helps to illustrate how such a step can be carried out, wherein after the stacked layers 2 have been molded by the molding assembly, the top and bottom barriers 36, 24 can be removed, thereby revealing the arrangement in FIG. 5. In particular, the stacked layers 2 comprise: an upper segment 52 which extends above a height of the sidewalls 32 of the thickness-defining portion 30; a lower segment 54 which extends below a height of the sidewalls 32 of the thickness-defining portion 30; and a central segment 56 (see FIG. 4) bound by the sidewalls 32 of the thickness-defining portion 30. It is this central segment 56 of the stacked layers 2 which is to be retained for further shaping into the desired salmon analog product 8. To this end, the sidewalls 32 of the thickness-defining portion 30 comprise an upper surface 58 and a lower surface 60 across which a cutting element (not shown) can be passed to remove the upper and lower segments 52, 54 of the stacked layers 2. In particular, the cutting element may be driven horizontally through the stacked layers 2, that is, in a direction perpendicular to the stacking direction and parallel to the upper and lower surfaces 58, 60 of the thickness-defining portion 30, thereby removing the upper and lower segments 52, 54 of the stacked layers 2. What remains would be the central segment 56 bound within the rectangular opening 34 of the thickness-defining portion 30. The central segment 56 may need to be held within the thickness-defining portion 30 so that it does not slide out therefrom through the opening 34 thereof.

FIGS. 6A to 8 illustrate steps that can be taken to configure the molding assembly 12 and prepare the stacked layers 2 for slicing. After the shaped stack 2 has been formed, as shown in FIG. 4, the top barrier 36 can then be removed, resulting in the configuration shown in FIG. 6A. Next, the profiling top 38 can be removed from the stack 2, resulting in the configuration shown in FIG. 6B. Next, the upper segment 52 of the stacked layers 2 can be slicingly removed, resulting in the configuration shown in FIG. 7A. At this stage, a cutting template 62 (to be discussed) may be secured against the upper surface 58 of the thickness-defining portion 30, resulting in the configuration shown in FIG. 7B. The configuration of FIG. 7B can then be inverted or flipped, whereupon the now upward facing profiling bottom 14 and the bottom barrier 24 can then be removed, thereby revealing the lower segment 54 of the stacked layers 2 which can similarly be slicingly removed. A second cutting template 62, constituting a mirror part of the first cutting template 62, a can then be secured against the lower surface 60 of the thickness-defining portion 30, as exemplified by FIG. 8. The or each cutting template 62 can help retain the stacked layer 2 within the thickness-defining portion 30, which is particularly advantageous when the configuration is inverted.

A final step of the present method involves cutting through the retained central segment 56 in the vertical stacking direction so as to form the cross-sectional shape of the salmon analog product 8. For example, there may be provided one or more cutting templates having a cutting shape formed therethrough which corresponds with the desired cross-sectional shape of the salmon analog product. A cutting element (not shown) may then be guided along the perimeter of the cutting shape so as to cut through the retained central segment 56 in the stacking direction, thereby obtaining the desired cross-sectional shape of the salmon analog product 8. Alternatively, the cutting template may be configured such that it can simply be pressed through the retained central segment 56 whereby the stacked layers 2 extrude through the cutting shape.

Figure 8:
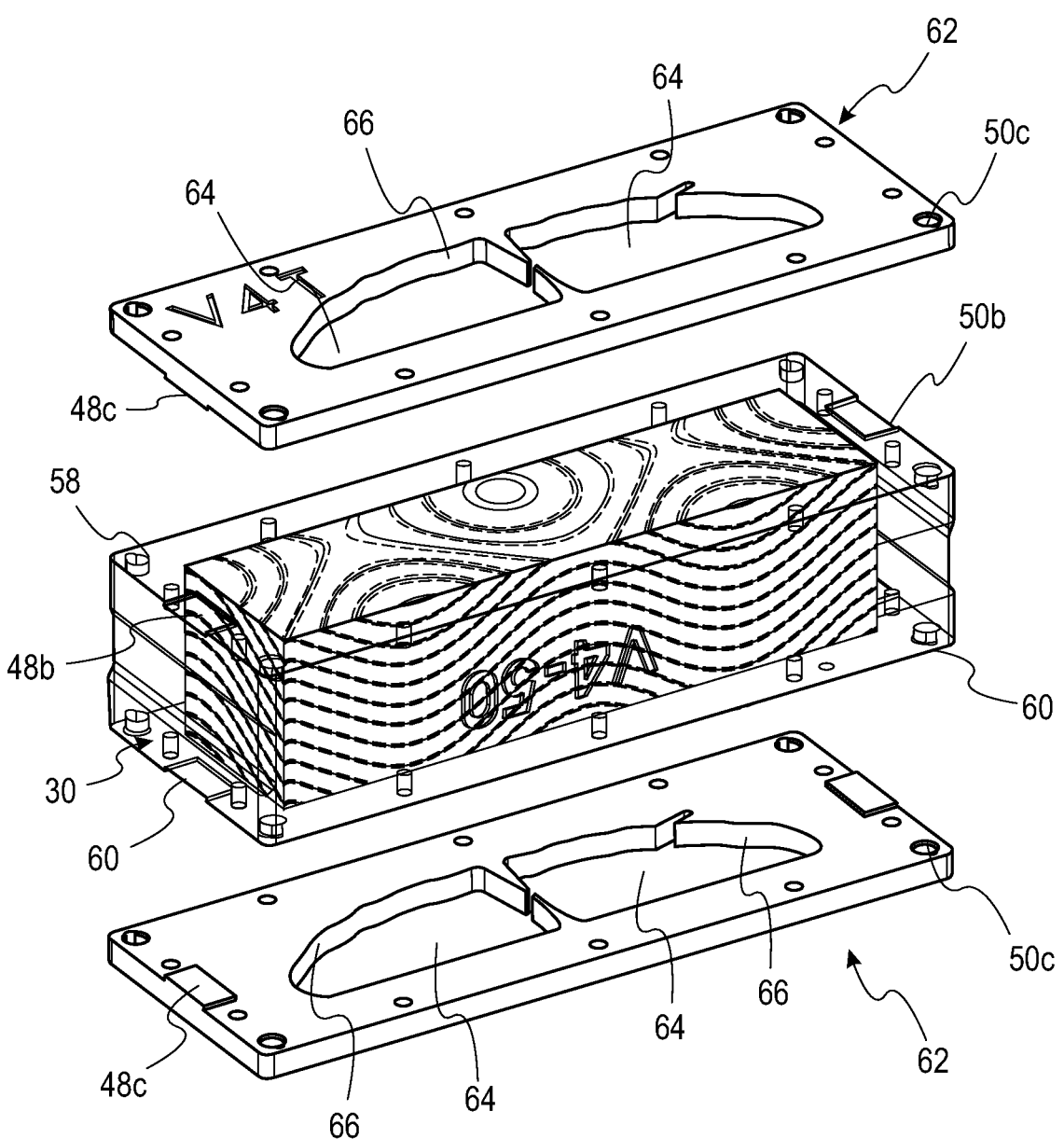
FIG. 8 is a front perspective view of the arrangement of FIG. 5 after upper and lower segments of the stacked layers have been slicingly removed, along with upper and lower cutting templates having a first cutting shape for use in shaping a cross-section of the fish fillet analog product to be formed, where the thickness-defining portion of the molding assembly is shown transparent for clarity purposes.
Figure 9A:
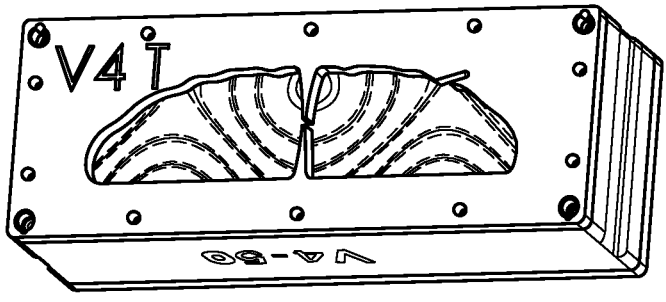
FIG. 9A is a top perspective view of the arrangement of FIG. 8, the thickness-defining portion sandwiched between the cutting templates.
Figure 9B:
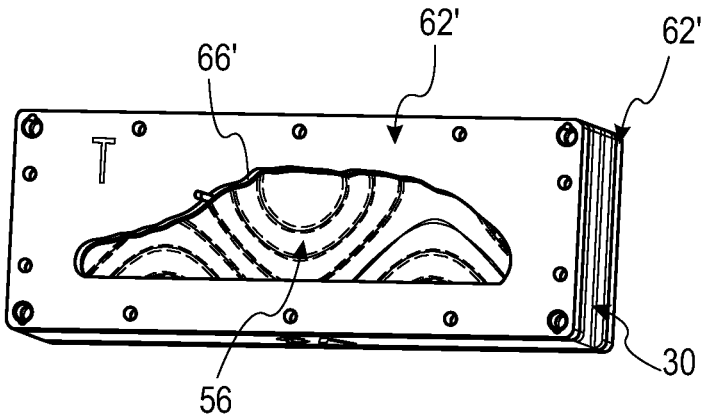
FIG. 9B is a top perspective view of an arrangement similar to that of FIG. 9A, though the thickness-defining portion is sandwiched between a pair of cutting templates having a second cutting shape.

With reference to FIG. 8, the present system may comprise sheet-like upper and lower cutting templates 62, each of which has identical cutting shapes 64 formed therethrough, perimeters 66 of which correspond with that of the salmon fillets 8 shown in FIG. 2. In use, the cutting templates 62 are arranged to sandwich against the upper and lower surfaces 58, 60 of the thickness-defining portion 30 (as shown in FIGS. 9A and 9B). The cutting templates 62 may be located relative to the thickness-defining portion 30 via complementary locating features 48b, 48c, and/or removably secured to the thickness-defining portion 30 via cooperating fastening features 50b, 50c. After the cutting templates 62 are positioned in place so as to sandwich the thickness-defining portion 30, a cutting element (not shown) may be guided along the perimeter 66 of the cutting shapes 64 so as to cut through the retained central segment 56 in the stacking direction so as to form the cross-sectional shape of the desired salmon analog product 8. Of course, as shown in FIGS. 9A and 9B, other cross-sectional shapes can be formed with the use of cutting templates 62' having different cutting shapes. Alternate cutting templates may be configured and formed such that they can simply be pressed through the layered stack 2 to form the shape of the desired fish product analog, functioning not unlike a cookie cutter pressing through dough. Of course, in an alternate method, the layers 4, 6 may be pre-shaped (e.g., precut or preformed) to have the desired shape prior to stacking, in which case the final fish product would be achieved upon slicingly removing the upper and lower segments 52, 54 and extracting the retained central segment 56 from the thickness-defining portion 30.

Figure 10A:
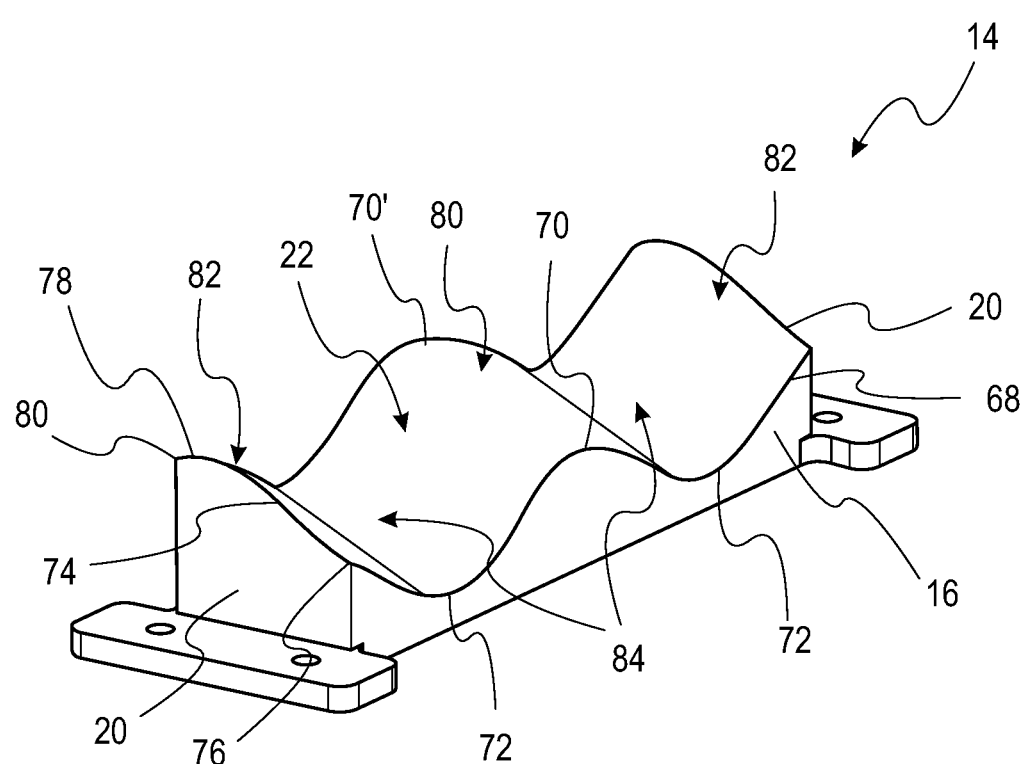
FIGS. 10A and 10B are respectively front and rear perspective views of a profiling bottom of the molding assembly of FIG. 3.
Figure 10B:
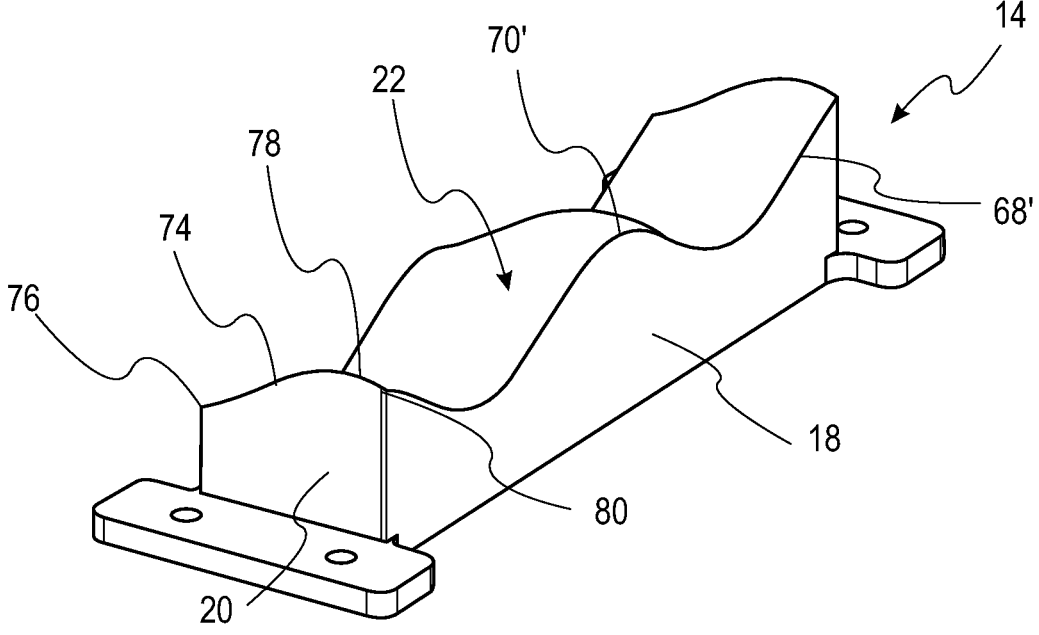

FIGS. 10A and 10B show an example profiling bottom 14 which is usable as part of the disclosed molding assembly 12 and in the presently disclosed system and method for forming a fish product analog. The profiling bottom 14 is itself a mold that can be used to shape the sheet-like layers 4, 6 such that they have an undulating form. The profiling bottom 14 has a generally rectangular footprint and comprises an undulating upper surface 22 upon which the layers 4, 6 of plant-based material can be stacked.

Figure 11:
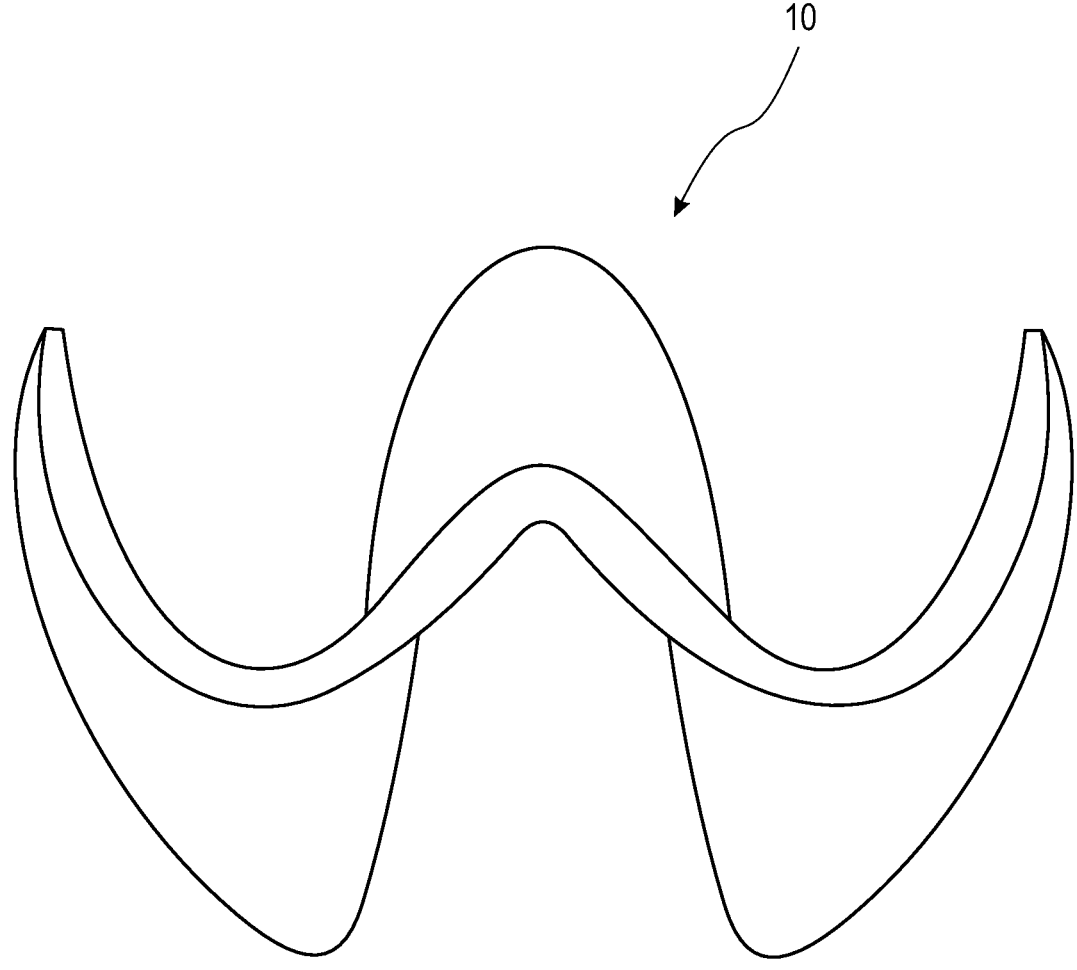
FIG. 11 is a schematic side view of a naturally occurring fish myomere.

Significantly, the undulating form of the upper surface 22 may correspond with or mimic the undulating form present in naturally occurring myomere of the fish in respect of which the product to be formed is an analog. For example, the undulating surface 22 of the mold 14 of FIGS. 10A and 10B is based on and corresponds with the undulating form of a single salmon myomere 10, a schematic of which is shown in FIG. 11. The geometric properties of the undulating upper surface 22 of the profiling bottom 14 (and thus the complementary undulating lower surface 44 of the profiling top 38) will now be described.

FIG. 10A shows a front wall 16 of the profiling bottom 14, which front wall 16 is illustrative of a lengthwise cross-sectional shape of the profiling bottom 14 (i.e., a cross-section taken across the length of the profiling bottom 14 between the opposed sidewalls 20). The lengthwise cross-section of the profiling bottom 14 taken at the front wall 16 comprises an upper edge 68 that follows an undulating path. The undulating path is in the form of a sinusoidal-like wave. In the depicted embodiment, the undulating upper edge 68 follows the path of approximately 2 wave cycles having a certain amplitude (complete with peaks 70 and troughs 72) and period corresponding to that of the target myomere, though of course other numbers of cycles, including non-full cycles, are within the scope of the present specification.

FIG. 10B shows a rear wall 18 of the profiling bottom 14, which rear wall 18 is also illustrative of a lengthwise cross-sectional shape of the profiling bottom 14. The shape of the lengthwise cross-section of the profiling bottom 14 taken at the rear wall 18 is similar to that of the front wall, wherein the upper undulating edge 68' also follows the path of approximately 2 wave cycles having the same amplitude and period corresponding to that of the target myomere, except that the undulating upper edge 68' of the rear wall 18 is vertically higher than that of the front wall 16. In other words, travelling in the widthwise direction from the front wall 16 to the rear wall 18, the undulating upper edge of each lengthwise cross-section gradually rises along an arcuate path. This can be seen via the opposed sidewalls 20 which are illustrative of the widthwise cross-sectional shape of the profiling bottom 14. Each sidewall 20 has an upper edge 74 that follows an arcuate path. In particular, the upper edge 74 of each sidewall 20 has a lowermost point 76 coincident with the undulating upper edge 68 of the front wall 16. Then, travelling in the widthwise direction toward the rear wall 18, the upper edge 74 of the sidewall 20 gradually increases in height to reach a peak 78 before arching downward slightly to a second point 80 coincident with the upper undulating edge 68' of the rear wall 18. Travelling in the lengthwise direction from one sidewall 20 to the opposite sidewall 20, the arched upper edge of each widthwise cross-section gradually rises and falls in accordance with the aforementioned sinusoidal wave-like undulation of the upper surface 22. In this way, the profiling bottom 14 has a nonuniform cross-section in both the width and lengthwise directions.

By using a profiling bottom 14 that comprises an undulating surface 22 mimicking that of naturally occurring myomere 10 of the target fish, the profiling bottom 14 can be used to mold stacked layers 4, 6 of plant-based material to have a corresponding undulating form so as to mimic the musculature of the target fish. It will be appreciated that the form of the undulating upper surface 22 of the example profiling bottom 14 is such that it comprises three concave zones 82 separated therebetween by two convex 84 zones. Upon molding the stacked layers 2 with the profiling bottom 14, the undulating layers 4, 6 are also formed with corresponding concave and convex zones 82, 84 (see FIG. 1). Then, by slicing along predetermined planes perpendicular or otherwise angled relative to the stacking direction of the stack 2, it is possible to obtain a product 8 (e.g., FIG. 2) that visually resembles a whole-cut of the target fish, complete with one or more sets of generally curved contour lines 86 radiating radially outwardly from a central 'eye' 88, which lines 86 are visible in the cross-sectional profile of the cut 8 and visually resemble the musculature of the target fish. To this end, in forming the fish analog product, it is preferable that the cutting shape 64 of the cutting templates 62 are sized and positioned such that they extend over at least one concave zone 82 and at least one convex zone 84 so as to reveal the radially radiating contoured lines 86 when the stacked layers 2 are sliced.

While various embodiments have been described herein, it should be understood that they have been presented by way of example only, and not by way of limitation. It will be apparent to a person skilled in the relevant art that various changes in form and detail can be made without departing from the spirit and scope of the invention. Thus, the scope of the present specification should not be limited by the embodiments described and depicted herein.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

The invention claimed is:

1. A method of forming a fish analog product which is an analog to a target fish from layers of plant-based material stacked on one another, the method comprising:

(i) providing a molding assembly having opposed sidewalls and a profiling bottom that has an undulating upper surface that corresponds to that of a naturally occurring myomere of the target fish, said profiling bottom having a lengthwise cross section with an upper undulating edge associated with said upper surface, with at least one peak and at least one trough defined along the upper undulating edge, at least one of the at least one peak or the at least one trough being spaced apart from an end of said edge;

(ii) successively stacking layers of plant-based material on one another in a stacking direction on the undulating upper surface of the profiling bottom and within the opposed sidewalls to form a stack of undulating layers having undulating upper surfaces;

(iii) slicing a first slice through the stack at a distance above the profiling bottom in a first slicing direction below the sidewalls, the first slicing direction being angled relative to the stacking direction, wherein the first slice defines one of an upper surface or a lower surface of the fish analog product; and (iv) slicing a second slice through the same stack in a second slicing direction above the sidewalls, wherein the second slice defines the other of the upper surface or lower surface of the fish analog product, wherein the upper and lower surfaces of the fish analog product show at least two curved contour lines that are continuous from at least one side of a central segment and at least one of the upper or lower surfaces of the fish analog product.

2. The method of claim 1, wherein the stack of layers in the fish analog product comprises at least one convex zone and at least one concave zone, wherein each lengthwise cross-section of the product passes through at least one convex zone in which said layers are curved in a convex manner and at least one concave zone in which said layers are curved in a concave manner.

3. The method of claim 2, wherein the layers are compacted together in the stacking direction such that each layer adheres to at least one other adjacent layer.

4. The method of claim 1, which further comprises pressing at least one cutting template along the stacking direction through the central segment so that the stacked layers thereof extrude through the cutting shape to form the fish analog product.

5. The method of claim 1, wherein the successive stacking of the layers of the step (ii) includes stacking alternating layers on one another, with some of the alternating layers corresponding with artificial muscle tissue of the analog to be formed, and other of the alternating layers corresponding with artificial connective tissue of the analog to be formed.

6. The method of claim 1, wherein prior to step (i), each layer is formed into similarly shaped strips sized for stacking on the undulating upper surface of the profiling bottom.

7. The method of claim 1, wherein the undulating layers comprise alternating layers successively stacked on one another, a first of the alternating layers corresponding with artificial muscle tissue of the fish analog product, a second of the alternating layers corresponding with artificial connective tissue of the fish analog product.

8. The method of claim 1, wherein each of the first slice and the second slice is made through at least 3 of the stacked layers of plant-based material of the stack.

9. The method of claim 1, wherein the first slicing direction, the second slicing direction or each of the first and second slicing directions is perpendicular to the stacking direction.

10. The method of claim 1, wherein the distance between the upper surface and the lower surface defines the thickness of the fish analog product.

11. The method of claim 1, wherein the first or second slice, or both, are made through the stack at a distance above the profiling bottom.

12. The method of claim 3, wherein the molding apparatus comprises a profiling top having an undulating lower surface complementary to the undulating upper surface of the profiling bottom and wherein the compacted layers are sandwiched between the profiling bottom and the profiling top such that each layer adheres to at least one or each adjacent layer.

* * * * *